(12) United States Patent
Fukutomi et al.

(10) Patent No.: US 8,456,544 B2
(45) Date of Patent: Jun. 4, 2013

(54) IMAGE PROCESSING APPARATUS, IMAGE PICKUP APPARATUS, STORAGE MEDIUM FOR STORING IMAGE PROCESSING PROGRAM, AND IMAGE PROCESSING METHOD FOR REDUCING NOISE IN RGB BAYER ARRAY IMAGE DATA

(75) Inventors: Takeshi Fukutomi, Hachioji (JP); Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 340 days.

(21) Appl. No.: 12/704,159

(22) Filed: Feb. 11, 2010

(65) Prior Publication Data
US 2010/0141809 A1  Jun. 10, 2010

Related U.S. Application Data

(63) Continuation of application No. PCT/JP2008/063784, filed on Jul. 31, 2008.

(30) Foreign Application Priority Data

Aug. 13, 2007  (JP) ................................. 2007-211075

(51) Int. Cl.
*H04N 5/217* (2011.01)
(52) U.S. Cl.
USPC .......................................................... 348/241
(58) Field of Classification Search
USPC ........................................................ 348/241
See application file for complete search history.

(56) References Cited

U.S. PATENT DOCUMENTS

| 7,016,549 | B1 | 3/2006 | Utagawa |
| 2006/0038899 | A1* | 2/2006 | Tamaru et al. ................. 348/241 |

FOREIGN PATENT DOCUMENTS

| JP | 2001-061157 A | 3/2001 |
| JP | 2003-123063 A | 4/2003 |
| JP | 2005-159916 A | 6/2005 |
| JP | 2006-060661 A | 3/2006 |

OTHER PUBLICATIONS

English Language International Search Report dated Nov. 4, 2008 issued in parent Appln. No. PCT/JP2008/063784.

* cited by examiner

*Primary Examiner* — Usman Khan
(74) *Attorney, Agent, or Firm* — Holtz, Holtz, Goodman & Chick, P.C.

(57) ABSTRACT

An image processing apparatus including a noise reducing portion for applying noise reduction to RGB Bayer array image data for each of RGB channels with a noise reduction amount H, and calculating $R_H G_H B_H$ Bayer array image data, and also applying the noise reduction to at least the G channel with a noise reduction amount L (L<H), and calculating image data $G_L$; a color difference calculating portion for calculating color difference data $(R_H-G_H)$ at a position of $R_H$ and color difference data $(B_H-G_H)$ at a position of $B_H$, based on the $R_H G_H B_H$ Bayer array image data; and a band-limited interpolating portion and an RGB calculating portion for calculating R, G and B image data at respective pixel positions, based on the color difference data $(R_H-G_H)$ and $(B_H-G_H)$, and the image data $G_L$.

10 Claims, 11 Drawing Sheets

IMAGE PROCESSING APPARATUS, IMAGE PICKUP APPARATUS, STORAGE MEDIUM FOR STORING IMAGE PROCESSING PROGRAM, AND IMAGE PROCESSING METHOD FOR REDUCING NOISE IN RGB BAYER ARRAY IMAGE DATA

CROSS REFERENCE TO RELATED APPLICATION

This application is a continuation application of PCT/JP2008/063784 filed on Jul. 31, 2008 and claims benefit of Japanese Application No. 2007-211075 filed in Japan on Aug. 13, 2007, the entire contents of which are incorporated herein by this reference.

BACKGROUND OF THE INVENTION

1. Field of the Invention

The present invention relates to an image processing apparatus for processing RGB Bayer array image data, an image pickup apparatus, a storage medium for storing an image processing program, and an image processing method.

2. Description of the Related Art

A single image pickup device is mostly used for a digital camera. For a digital video camera, a two or three image pickup device may be used, or the single image pickup device may be used.

If the single image pickup device as described above is a color image pickup device, the single image pickup device includes a mosaic color filter on an image pickup surface. Typical color filter arrays include, for example, an RGB Bayer array.

In RGB Bayer array image data obtained from the image pickup device of the RGB Bayer array as described above, some image pickup systems may have different amounts of noise in respective RGB channels. Then, the noise in one channel is more conspicuous than the noise in other channels and thus is observed as color noise, which may not be preferable for image quality.

As a method for solving such a problem, it is conceivable to perform a process for increasing a noise reduction amount for the channel with a large amount of noise. However, if the method as described above is used, a waveform of the channel with the increased noise reduction amount becomes obtuse and different from waveforms of other channels, which is another problem.

Generally, in a noise reduction process in which the process is performed within one frame, as the noise reduction amount is increased, resolution impression and sharpness impression of an image are degraded. As a result, it is known that a false color occurs at an edge portion of the image.

In order to suppress the occurrence of the false color as described above, it is conceivable to increase not only the noise reduction amount for a particular channel, but also the noise reduction amounts for all the channels similarly. However, in this case, while a total noise reduction effect increases, the resolution impression and the sharpness impression of the image are significantly degraded due to a reason as described above.

Consequently, Japanese Patent Application Laid-Open Publication No. 2003-123063 has proposed a color noise reduction technique in which no false color occurs at an edge. In the technique described in the publication, a process is performed in which a color difference signal is used to detect a color edge, noise reduction is not applied to the color edge so that the false color may not occur, and the color noise is reduced at other portions.

SUMMARY OF THE INVENTION

An image processing apparatus according to a first aspect of the present invention is an image processing apparatus for processing RGB Bayer array image data obtained from an image pickup device of an RGB Bayer array, including a noise reducing section for applying noise reduction to the RGB Bayer array image data for each of RGB channels with a first noise reduction amount, and calculating first noise-reduced RGB Bayer array image data, and also applying the noise reduction to at least the G channel with a second noise reduction amount smaller than the first noise reduction amount, and calculating second noise-reduced G-channel image data; a color difference calculating section for calculating first noise-reduced color difference data (R−G) at a position of R and first noise-reduced color difference data (B−G) at a position of B, based on the first noise-reduced RGB Bayer array image data; and an RGB calculating section for calculating R image data, G image data and B image data at respective pixel positions, based on the first noise-reduced color difference data (R−G) and (B−G), and the second noise-reduced G-channel image data.

An image pickup apparatus according to a second aspect of the present invention includes a lens; an image pickup device of an RGB Bayer array which is arranged at an image-forming position of the lens; and an image processing apparatus according to the above described first aspect, and the image processing apparatus processes RGB Bayer array image data obtained from the image pickup device of the RGB Bayer array.

A storage medium for storing an image processing program according to a third aspect of the present invention is a storage medium for storing an image processing program for causing a computer to process RGB Bayer array image data obtained from an image pickup device of an RGB Bayer array, the program being for causing the computer to execute a noise reduction step of applying noise reduction to the RGB Bayer array image data for each of RGB channels with a first noise reduction amount, and calculating first noise-reduced RGB Bayer array image data, and also applying the noise reduction to at least the G channel with a second noise reduction amount smaller than the first noise reduction amount, and calculating second noise-reduced G-channel image data; a color difference calculation step of calculating first noise-reduced color difference data (R−G) at a position of R and first noise-reduced color difference data (B−G) at a position of B, based on the first noise-reduced RGB Bayer array image data; and an RGB calculation step of calculating R image data, G image data and B image data at respective pixel positions, based on the first noise-reduced color difference data (R−G) and (B−G), and the second noise-reduced G-channel image data.

An image processing method according to a fourth aspect of the present invention is an image processing method of processing RGB Bayer array image data obtained from an image pickup device of an RGB Bayer array, including a noise reduction step of applying noise reduction to the RGB Bayer array image data for each of RGB channels with a first noise reduction amount, and calculating first noise-reduced RGB Bayer array image data, and also applying the noise reduction to at least the G channel with a second noise reduction amount smaller than the first noise reduction amount, and calculating second noise-reduced G-channel image data; a color difference calculation step of calculating first noise-reduced color difference data (R−G) at a position of R and first noise-reduced color difference data (B−G) at a position of B, based on the first noise-reduced RGB Bayer array image data; and an RGB calculation step of calculating R image data, G image data and B image data at respective pixel positions, based on the first noise-reduced color difference data (R−G) and (B−G), and the second noise-reduced G-channel image data.

DETAILED DESCRIPTION OF THE PREFERRED EMBODIMENTS

Hereinafter, embodiments of the present invention will be described with reference to the drawings.

Embodiment 1

Figure 1:
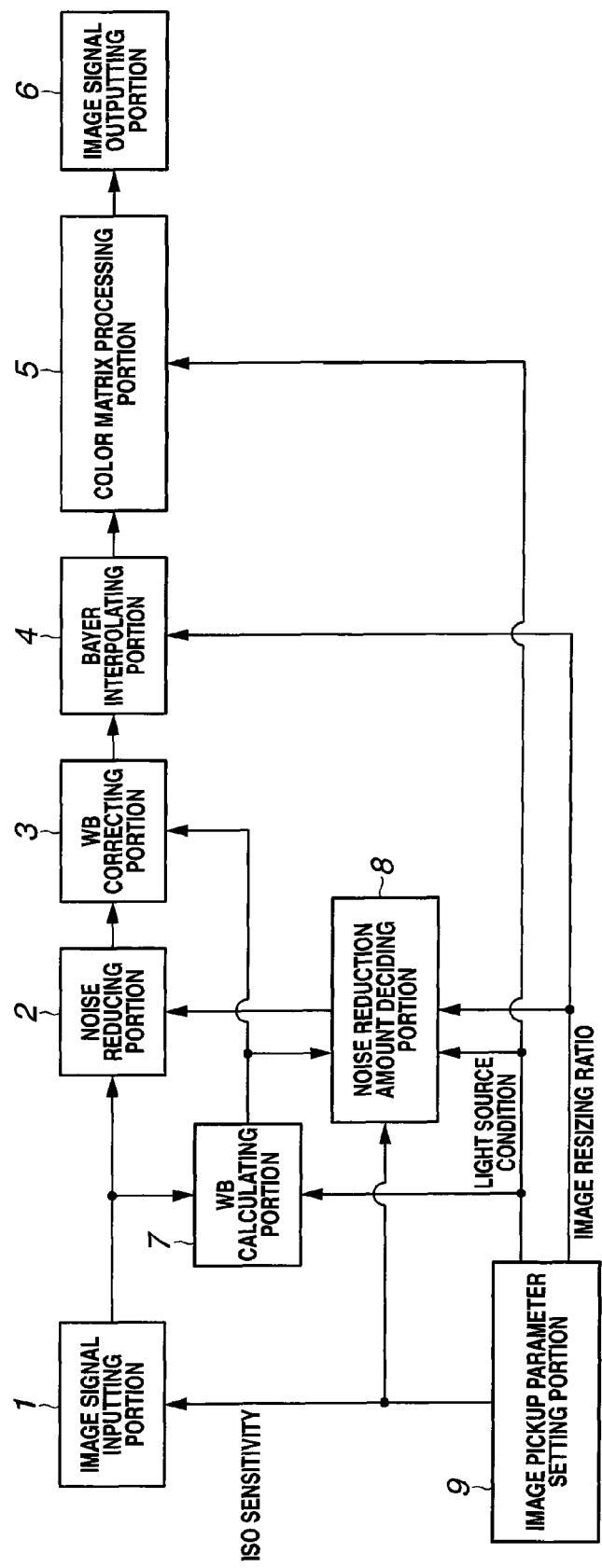
FIG. 1 is a block diagram showing a configuration of an image processing apparatus in an Embodiment 1 of the present invention.

FIGS. 1 to 6 show an Embodiment 1 of the present invention. FIG. 1 is a block diagram showing a configuration of an image processing apparatus.

As shown in FIG. 1, the image processing apparatus is configured to include an image signal inputting portion 1, a noise reducing portion 2 which is a noise reducing section, a WB (white balance) correcting portion 3, a Bayer interpolating portion 4, a color matrix processing portion 5, an image signal outputting portion 6, a WB calculating portion 7, a noise reduction amount deciding portion 8 which is a reduction amount setting section, and an image pickup parameter setting portion 9.

The image pickup parameter setting portion 9 outputs an ISO sensitivity as an image pickup parameter (a shooting condition) to the image signal inputting portion 1 and the noise reduction amount deciding portion 8. Moreover, the image pickup parameter setting portion 9 outputs a light source condition as the image pickup parameter (the shooting condition) to the WB calculating portion 7, the noise reduction amount deciding portion 8 and the color matrix processing portion 5. Furthermore, the image pickup parameter setting portion 9 outputs an image resizing ratio as the image pickup parameter (the shooting condition) to the noise reduction amount deciding portion 8 and the Bayer interpolating portion 4.

The image signal inputting portion 1 is connected to the noise reducing portion 2 and the WB calculating portion 7. The WB calculating portion 7 is connected to the WB correcting portion 3 and the noise reduction amount deciding portion 8. The noise reduction amount deciding portion 8 is connected to the noise reducing portion 2. The noise reducing portion 2 is connected to the image signal outputting portion 6 via the WB correcting portion 3, the Bayer interpolating portion 4 and the color matrix processing portion 5.

The image signal inputting portion 1 includes, for example, a lens, an image pickup device of an RGB Bayer array, and the like, and in this case, the image processing apparatus is configured as an image pickup apparatus. However, instead thereof, the image processing apparatus may be such an apparatus in which the image signal inputting portion 1 inputs RGB Bayer array image data or the image pickup parameter via a storage medium or a communication apparatus.

Next, operations of the image processing apparatus as shown in FIG. 1 will be described.

The image signal inputting portion 1 obtains RGB Bayer signals based on image pickup parameter information (for example, the ISO sensitivity and the like) from the image pickup parameter setting portion 9. Then, the image signal inputting portion 1 sequentially outputs the obtained RGB Bayer signals to the noise reducing portion 2.

The noise reducing portion 2 performs a noise reduction process (NR process) for the RGB Bayer signals based on noise reduction amount information decided by the noise reduction amount deciding portion 8. Then, the noise reducing portion 2 outputs the RGB Bayer signals applied with the noise reduction process to the WB correcting portion 3.

Here, the noise reduction amount deciding portion 8 calculates the noise reduction amount information, based on the image pickup parameter information (for example, the ISO sensitivity, the light source condition, the image resizing ratio and the like) from the image pickup parameter setting portion 9, and WB coefficient information from the WB calculating portion 7.

Here, furthermore, the WB calculating portion 7 calculates the WB coefficient information, based on the image pickup parameter information (for example, the light source condition and the like) from the image pickup parameter setting portion 9, and the RGB Bayer signals from the image signal inputting portion 1.

The WB correcting portion 3 performs a WB process for the RGB Bayer signals based on the WB coefficient information from the WB calculating portion 7. Then, the WB correcting portion 3 outputs the RGB Bayer signals applied with the WB process to the Bayer interpolating portion 4. In the WB process, under an image pickup condition with a common light source, an amount of gain of R (red) or B (blue) needs to be increased relative to an amount of gain of G (green), which is caused by a difference in sensitivity characteristics of R, G and B pixels of the image pickup device. Then, along with the WB process, an amount of noise of R or B increases relative to that of G, which, as a result, causes color noise to appear.

The Bayer interpolating portion 4 performs a Bayer interpolation process for the RGB Bayer signals, and thereby converts the RGB Bayer signals into RGB color signals. Then, the Bayer interpolating portion 4 outputs the RGB color signals to the color matrix processing portion 5.

The color matrix processing portion 5 performs a color matrix process for the RGB color signals based on the image pickup parameter information (for example, the light source condition and the like) from the image pickup parameter setting portion 9. Then, the color matrix processing portion 5 inputs the RGB color signals applied with the color matrix process to the image signal outputting portion 6.

The image signal outputting portion 6 outputs the RGB color signals from the color matrix processing portion 5 to be displayed, stored or transmitted.

In the present embodiment, it is premised that the Bayer interpolation process performed by the Bayer interpolating portion 4 is a process for reducing, for example, a Bayer image of 8 million (8M) pixels to an RGB image of 2 million (2M. It should be noted that, hereinafter, similarly, "M" is used as a sign representing "million" as appropriate.) pixels. In addition, under such a process, the color noise can be reduced, which will be described with reference to FIG. 2.

Figure 2:
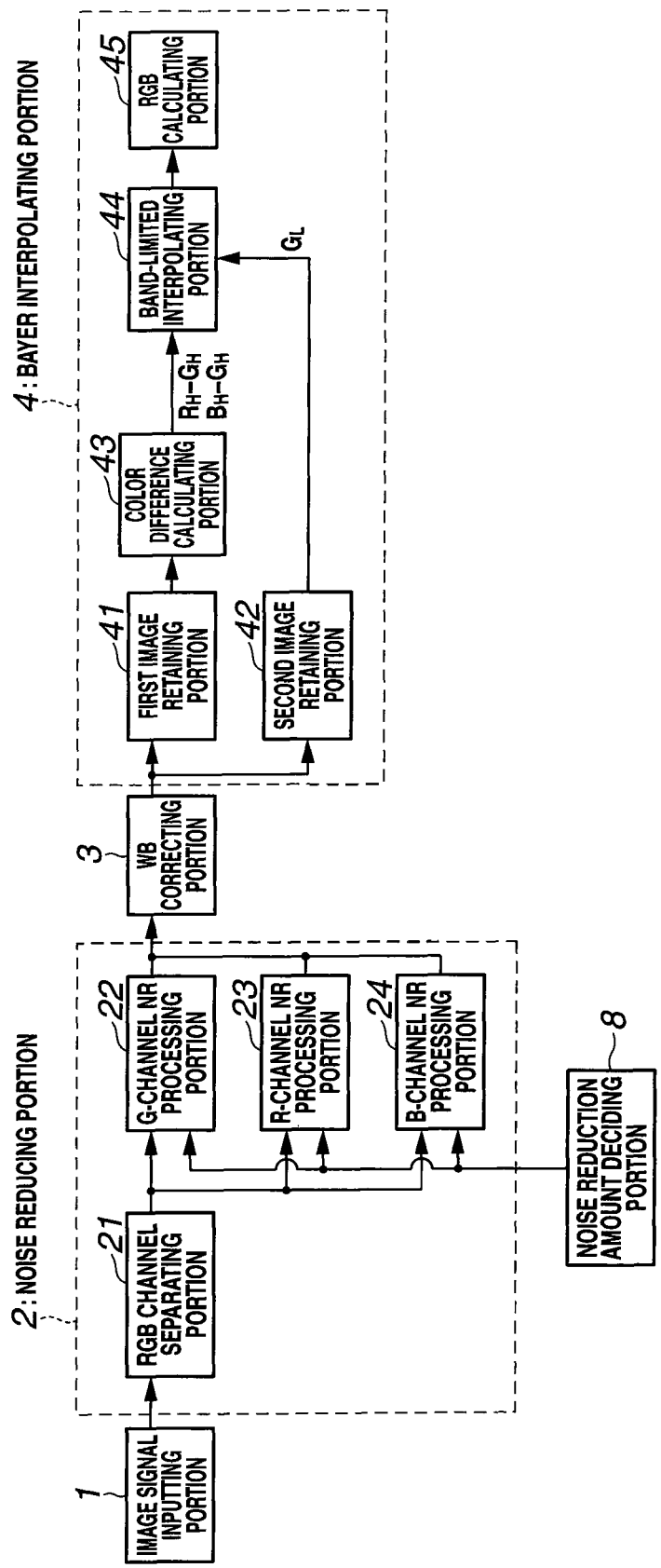
FIG. 2 is a block diagram showing configurations of a noise reducing portion and a Bayer interpolating portion in the above described Embodiment 1 in more detail.

Here, FIG. 2 is a block diagram showing configurations of the noise reducing portion 2 and the Bayer interpolating portion 4 in more detail.

The noise reducing portion 2 is configured to have an RGB channel separating portion 21, a G-channel NR processing portion 22, an R-channel NR processing portion 23 and a B-channel NR processing portion 24.

The image signal inputting portion 1 is connected to the G-channel NR processing portion 22, the R-channel NR processing portion 23 and the B-channel NR processing portion 24, respectively, via the RGB channel separating portion 21. Moreover, the noise reduction amount deciding portion 8 is also connected to the G-channel NR processing portion 22, the R-channel NR processing portion 23 and the B-channel NR processing portion 24, respectively. The G-channel NR processing portion 22, the R-channel NR processing portion 23 and the B-channel NR processing portion 24 are connected to the WB correcting portion 3.

The Bayer interpolating portion 4 is configured to have a first image retaining portion 41, a second image retaining portion 42, a color difference calculating portion 43 which is a color difference calculating section, a band-limited interpolating portion 44 which is an RGB calculating section and a band-limited interpolating section, and an RGB calculating portion 45 which is the RGB calculating section.

The WB correcting portion 3 is connected to the first image retaining portion 41 and the second image retaining portion 42. The first image retaining portion 41 is connected to the band-limited interpolating portion 44 via the color difference calculating portion 43. The second image retaining portion 42 is directly connected to the band-limited interpolating portion 44. The band-limited interpolating portion 44 is connected to the RGB calculating portion 45.

Next, operations of the configurations as shown in FIG. 2 will be described.

When the RGB Bayer signals from the image signal inputting portion 1 are sequentially inputted to the noise reducing portion 2, the noise reducing portion 2 separates the inputted RGB Bayer signals into an R channel, a G channel and a B channel by the RGB channel separating portion 21, and inputs an R-channel signal to the R-channel NR processing portion 23, a G-channel signal to the G-channel NR processing portion 22, and a B-channel signal to the B-channel NR processing portion 24, respectively.

The R, G and B-channel NR processing portions 23, 22 and 24 use noise reduction amounts decided by the noise reduction amount deciding portion 8, to perform the NR (noise reduction) process. Here, in the present embodiment, the noise reduction amount deciding portion 8 decides first noise reduction amounts RH, GH and BH depending on the R, G and B channels, respectively, and a second noise reduction amount GL depending on only the G channel (here, the decision is made so that GL<GH is satisfied). Therefore, the R, G and B-channel NR processing portions 23, 22 and 24 output $R_H G_H B_H$ Bayer signals (first noise-reduced RGB Bayer array image data) applied with the NR process by using the first noise reduction amounts RH, GH and BH, to the WB correcting portion 3. Also, the G-channel NR processing portion 22 outputs a $G_L$ signal (second noise-reduced G-channel image data) applied with the NR process by using the second noise reduction amount GL, to the WB correcting portion 3.

The above described $R_H G_H B_H$ Bayer signals, which have been outputted from the R, G and B-channel NR processing portions 23, 22 and 24 and applied with the WB process as described above by the WB correcting portion 3, are inputted to and retained in the first image retaining portion 41.

Moreover, the above described $G_L$ signal, which has been outputted from the G-channel NR processing portion 22 and applied with the WB process as described above by the WB correcting portion 3, is inputted to and retained in the second image retaining portion 42.

The color difference calculating portion 43 uses the $R_H G_H B_H$ Bayer signals inputted from the first image retaining portion 41 to calculate $(R_H - G_H) G_H (B_H - G_H)$ color difference Bayer signals. Then, the color difference calculating portion 43 outputs the $(R_H - G_H)$ signal (first noise-reduced color difference data) and the $(B_H - G_H)$ signal (the first noise-reduced color difference data) in the calculated color difference Bayer signals, to the band-limited interpolating portion 44.

The band-limited interpolating portion 44 uses the $(R_H - G_H)$ signal and the $(B_H - G_H)$ signal which have been inputted from the color difference calculating portion 43, and the $G_L$ signal inputted from the second image retaining portion 42 to perform interpolation of the signals while bands are limited (for example, so that the number of pixels after the interpolation becomes smaller than the number of pixels of the $G_L$ signal), and outputs the interpolated signals to the RGB calculating portion 45.

The RGB calculating portion 45 calculates RGB signals based on the interpolated signals, and outputs the RGB signals.

Figure 3:
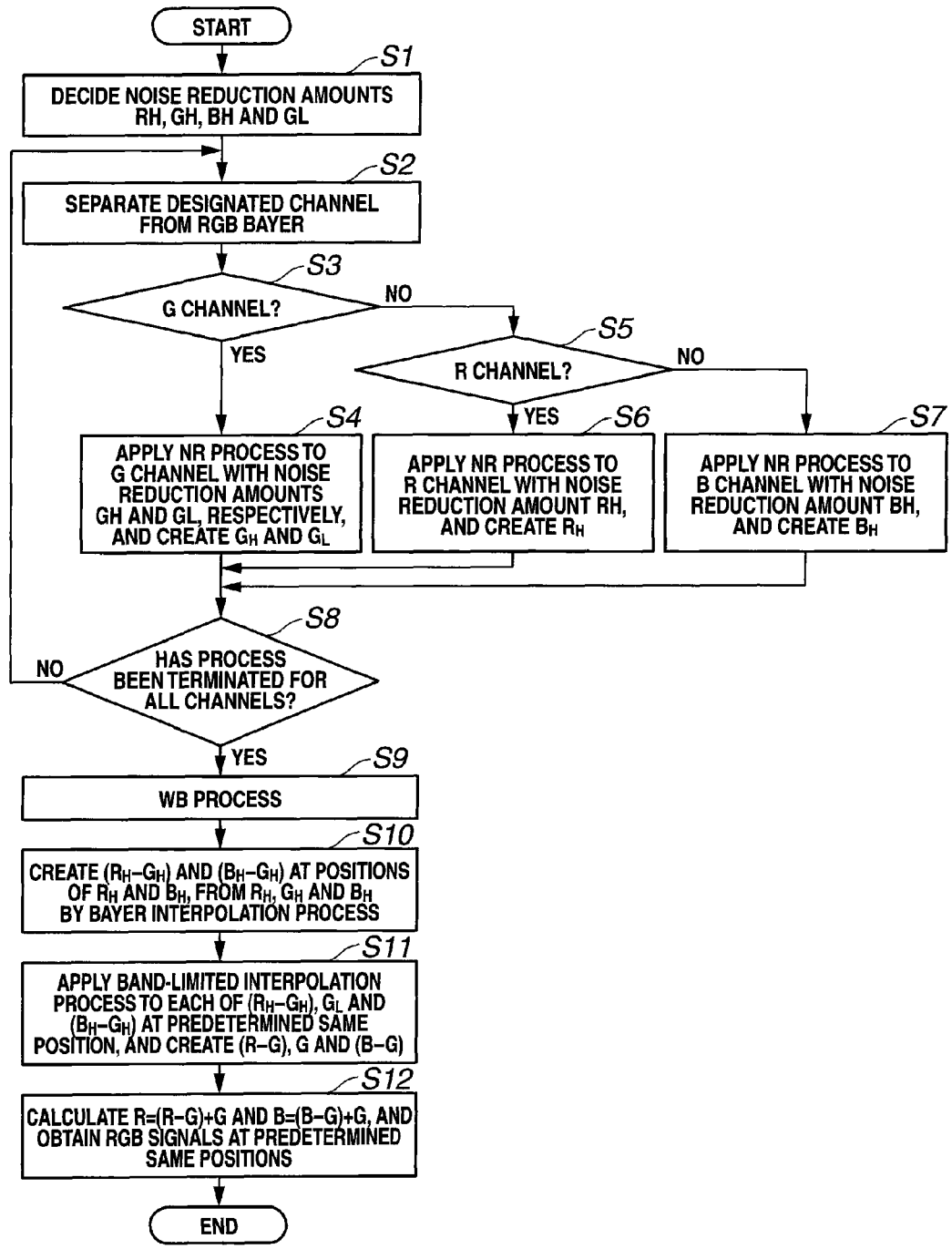
FIG. 3 is a flowchart showing a flow of processes in portions of the configurations as shown in FIG. 2 in the image processing apparatus of the above described Embodiment 1.
Figure 4:
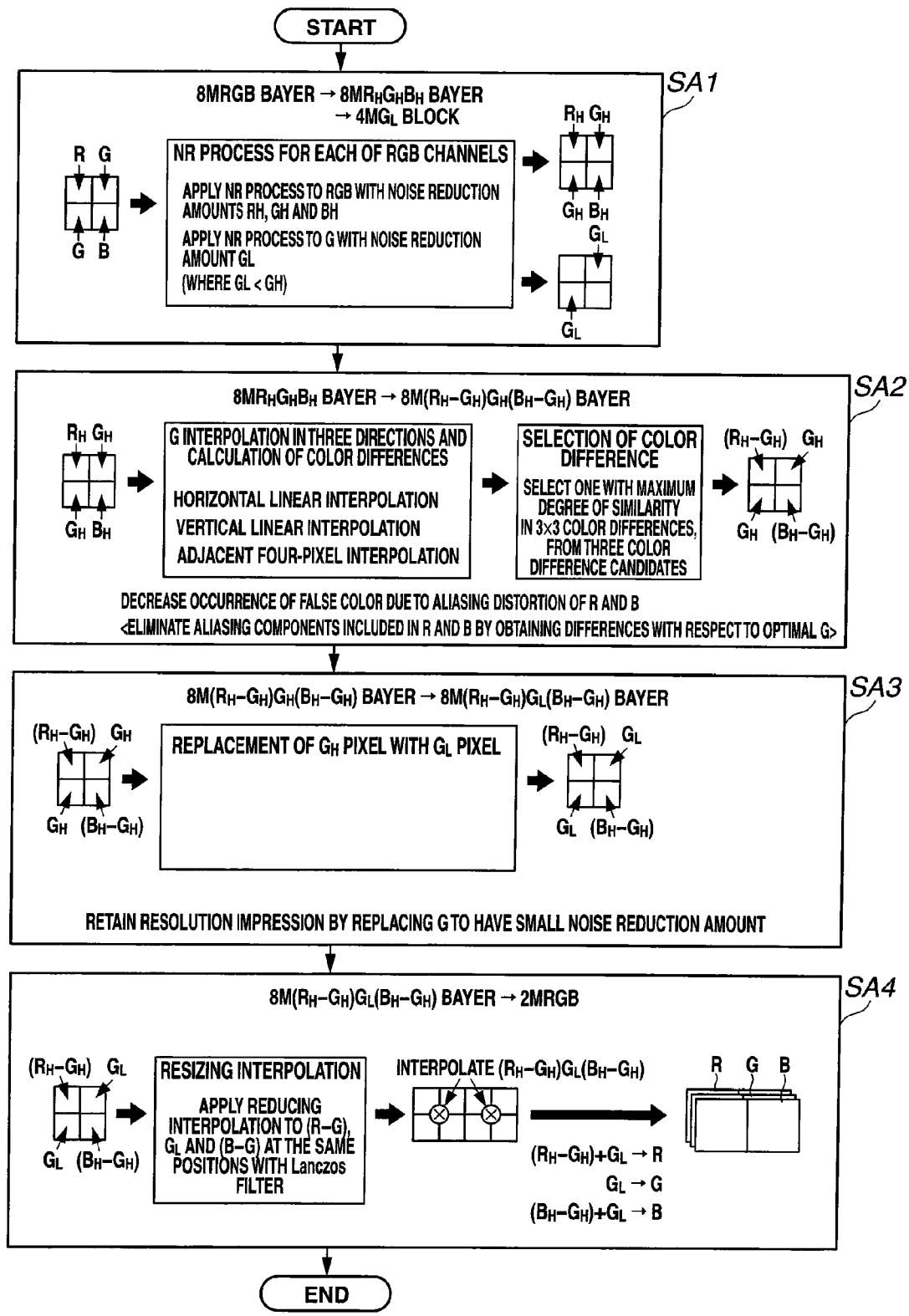
FIG. 4 is a flowchart schematically showing details of the processes in the portions of the configurations as shown in FIG. 2 in the image processing apparatus of the above described Embodiment 1.

Next, with reference to FIGS. 3 and 4, an example of a flow of specific processes in the image processing apparatus will be described. FIG. 3 is a flowchart showing a flow of processes in portions of the configurations as shown in FIG. 2 in the image processing apparatus. FIG. 4 is a flowchart schematically showing details of the processes in the portions of the configurations as shown in FIG. 2 in the image processing apparatus.

When the processes are started, the noise reduction amounts RH, GH and BH and the noise reduction amount GL are decided by the noise reduction amount deciding portion 8 (step S1). Then, the noise reduction amounts GH and GL are outputted to the G-channel NR processing portion 22, the noise reduction amount RH is outputted to the R-channel NR processing portion 23, and the noise reduction amount BH is outputted to the B-channel NR processing portion 24, respectively.

On the other hand, the RGB channel separating portion 21 separates a designated channel from RGB Bayer image signals inputted from the image signal inputting portion 1 (step S2).

Then, it is determined whether or not the separated channel is the G channel (step S3).

Here, if it is determined that the separated channel is the G channel, the G-channel NR processing portion 22 applies the NR process to the G-channel signal by using the noise reduction amount GH, and creates the signal $G_H$. Also, the G-channel NR processing portion 22 applies the NR process to the G-channel signal by using the noise reduction amount GL, and creates the signal $G_L$ (step S4). Then, the G-channel NR processing portion 22 outputs the created signals $G_H$ and $G_L$ to the WB correcting portion 3.

Moreover, in step S3, if it is determined that the separated channel is not the G channel, it is determined whether or not the separated channel is the R channel (step S5).

Here, if it is determined that the separated channel is the R channel, the R-channel NR processing portion 23 applies the NR process to the R-channel signal by using the noise reduction amount RH, and creates the signal $R_H$ (step S6). Then, the R-channel NR processing portion 23 outputs the created signal $R_H$ to the WB correcting portion 3.

In step S5, if it is determined that the separated channel is not the R channel, the determination means that the separated channel is the B channel. Thus, the B-channel NR processing portion 24 applies the NR process to the B-channel signal by using the noise reduction amount BH, and creates the signal $B_H$ (step S7). Then, the B-channel NR processing portion 24 outputs the created signal $B_H$ to the WB correcting portion 3.

It should be noted that specific NR processes in steps S4, S6 and S7 will be described later with reference to step SA1 of FIG. 4.

After the process in step S4, S6 or S7 has been performed, it is determined whether or not the process has been terminated for all the channels (step S8). If there is still any unprocessed channel, the process returns to step S2, and the process as described above is performed for the unprocessed channel as the designated channel.

As described above, in step S8, if it is determined that the process has been terminated for all the channels, the WB correcting portion 3 performs the WB process for each signal applied with the NR process (step S9).

Next, a plurality of color difference signals ($R_H$–$G_H$) and a plurality of color difference signals ($B_H$–$G_H$) are created from the $G_H$ signal applied with the NR process by using the noise reduction amount GH, and the $R_H$ and $B_H$ signals applied with the NR process by using the noise reduction amounts RH and BH, respectively. Then, one optimal color difference signal ($R_H$–$G_H$) and one optimal color difference signal ($B_H$–$G_H$) are decided from the created plurality of color difference signals (step S10). It should be noted that a specific color difference calculation process and a specific selection process in step S10 will be described later with reference to step SA2 of FIG. 4.

Subsequently, a band-limited interpolation process is performed for each of the $G_L$ signal applied with the NR process by using the noise reduction amount GL, and the optimal color difference signals ($R_H$–$G_H$) and ($B_H$–$G_H$) (step S11).

Afterward, the G signal applied with the band-limited interpolation is added to (R–G) and (B–G) applied with the band-limited interpolation, respectively, and thereby, the R and B signals applied with the band-limited interpolation are calculated (step S12).

It should be noted that specific interpolation processes in steps S11 and S12 will be described later with reference to steps SA3 and SA4 of FIG. 4.

Next, with reference to FIG. 4, main portions of the respective processes shown in FIG. 3 will be more specifically described.

First, in step SA1, a process as described below is performed.

The noise reduction process (NR process) is applied to an RGB Bayer image of 8M, for each of the RGB channels. The NR process is the NR process in which the noise reduction amount can be changed. A specific example of the NR process as described above will be shown below.

First, an amount of noise caused by the image pickup apparatus is set as an amount of coring. In the image pickup apparatus, generally, it is known that when a signal level increases, the amount of noise also increases. Therefore, one amount of noise is decided for one signal level, and the decided amount of noise is set as the amount of coring.

Next, a signal which is obtained by performing a spatial smoothing filtering process for an original signal including certain noise is set as a reference signal.

Subsequently, the reference signal is compared with the original signal, and, for example, a difference therebetween is obtained. If the difference is equal to or smaller than the above described amount of coring, the original signal is replaced with the reference signal and outputted as a noise-reduced signal. On the other hand, if the difference is larger than the above described amount of coring, the comparison is further performed to determine whether the original signal is larger than the reference signal. Then, if the original signal is larger than the reference signal, the original signal from which the amount of coring has been subtracted is outputted as the noise-reduced signal. If the original signal is smaller than the reference signal, the original signal to which the amount of coring has been added is outputted as the noise-reduced signal.

In the noise reduction process as described above, the noise reduction amount can be changed by multiplying the amount of coring by a certain coefficient to change the amount of coring. Specifically, there is an example in which the amount of coring multiplied by 0.5 is a noise reduction amount L, and the amount of coring multiplied by 2 is a noise reduction amount H. In addition, in the NR process as described above, if the amount of coring is increased, more original signals are replaced with the above described reference signals which have been smoothed, and thus the noise is reduced more.

As shown in FIG. 1, the noise reduction amount deciding portion 8 decides the noise reduction amount based on the image pickup parameter (for example, a light source characteristic at a time of shooting, an ISO sensitivity setting of a camera, an RGB coefficient included in a WB coefficient, or the like).

As a specific example, if R has been multiplied by the coefficient of a value that is twice in comparison with the value for G, by a WB correction process and the color matrix process, such a process is performed in which the noise reduction amount deciding portion 8 sets a value of the noise reduction amount for R to a value that is twice as large as a value of the noise reduction amount for G. Then, imbalance of RGB due to the WB correction process or the color matrix process can be calculated based on the image pickup parameter such as the light source characteristic at the time of the shooting.

Moreover, if a process has been performed in which uniform gain is applied to an entire image due to the ISO sensitivity setting of a digital camera or the like, both the noise reduction amounts H and L can also be uniformly changed while a ratio of the noise reduction amount H to the noise reduction amount L is maintained, or the ratio of the noise reduction amount H to the noise reduction amount L can also be changed.

For example, in the digital camera to which the image processing apparatus has been applied, if the ISO sensitivity setting has been changed from ISO 100 to ISO 200 in the digital camera, an image of ISO 200 generally means that twice as much gain has been applied to an entire screen of an image of ISO 100. Then, if a process for uniformly changing both the noise reduction amounts H and L while the ratio of the noise reduction amount H to the noise reduction amount L is maintained is performed, and if the noise reduction amounts at ISO 100 are H and L, when the ISO sensitivity setting is changed to ISO 200, the noise reduction amounts are also accordingly changed to 2H and 2L (doubled values of H and L, respectively). Thereby, for example, if the process such as the ISO sensitivity setting has been performed in which the uniform gain is applied to the screen, the noise reduction amounts are not required to be calculated each time, and only a simple process for multiplying the noise reduction amounts which have been already calculated, by a predefined numerical value may be performed, which is an advantage. In contrast, as described above, the ratio of the noise reduction amount H to the noise reduction amount L can also be changed for each ISO sensitivity setting. Therefore, more appropriate noise reduction amounts can also be decided with a high degree of precision.

If the noise reduction process as described above is performed, when the noise reduction amount H is set to be a value larger than the noise reduction amount L, the noise included in color differences ($R_H$–$G_H$) and ($B_H$–$G_H$) generated at a time of the Bayer interpolation is further decreased, which, as a result, provides an effect of decreasing the color noise more strongly. In other words, the noise reduction amount H becomes an amount which defines an amount of the color noise.

In contrast, the G signal, which has been applied with the band-limited interpolation with the $G_L$ signal in which the noise has been decreased by using the noise reduction amount L and thereby has been calculated, is the signal that is added to (R–G) and (B–G), which have been applied with the band-limited interpolation with the above described color differences ($R_H$–$G_H$) and ($B_H$–$G_H$), so that the RGB signals are calculated. Therefore, the noise included in the G signal is mixed in the RGB signals which are output results, to the same degree. In other words, the noise reduction amount L becomes an amount which defines an amount of luminance noise.

Therefore, a control may be performed so that if the decrease in the color noise is prioritized over a decrease in the luminance noise, the value of the noise reduction amount H is set to be larger than a value of the noise reduction amount L, and conversely, if the decrease in the luminance noise is prioritized over the decrease in the color noise, the value of the noise reduction amount H is set to be closer to the value of the noise reduction amount L.

Figure 5:
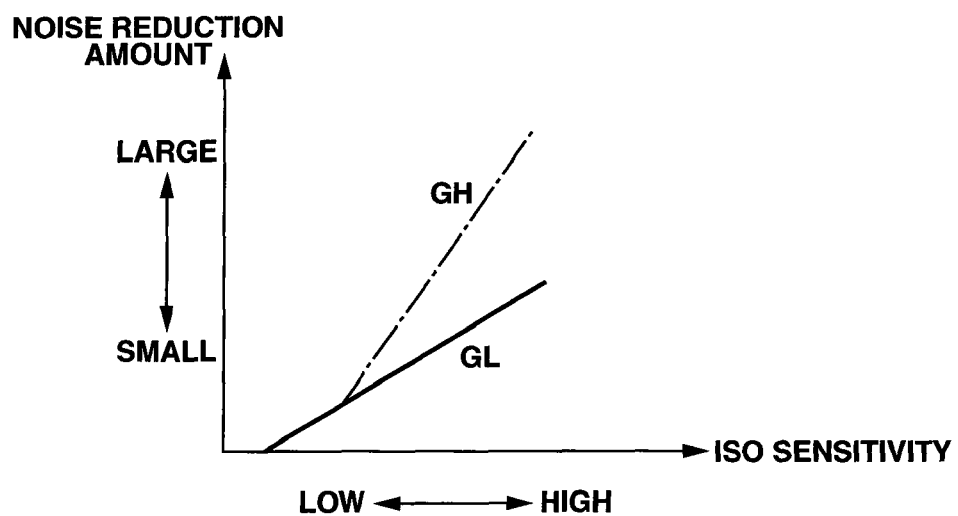
FIG. 5 is a diagram showing an example in which noise reduction amounts GH and GL are controlled depending on an increase or a decrease in an ISO sensitivity in the above described Embodiment 1.

FIG. 5 is a diagram showing an example in which the noise reduction amounts GH and GL are controlled depending on an increase or a decrease in the ISO sensitivity.

The color noise tends to become apparent as the ISO sensitivity increases, and conversely, become less apparent when the ISO sensitivity is lowered. Consequently, in order to more effectively decrease such color noise, in the example shown in FIG. 5, in an area with low ISO sensitivity, the noise reduction amount H (the noise reduction amount GH in FIG. 5) and the noise reduction amount L (the noise reduction amount GL in FIG. 5) are set to have the same value. However, as the ISO sensitivity increases, the noise reduction amount H is set to be the value larger than the noise reduction amount L (so that the ratio also becomes larger). Thereby, if the ISO sensitivity is high, the RGB signals can be generated in which the color noise has been decreased while a luminance resolution is maintained. Moreover, if the ISO sensitivity is low, since the noise reduction amount H is small and spatial frequencies of the above described color differences (R–G) and (B–G) do not need to be lowered, the RGB signals can be generated in which not only the luminance resolution but also a color resolution are maintained high.

The noise reduction amounts which are changed depending on the ISO sensitivity may be obtained by calculations based on the ISO sensitivity for each process, or the noise reduction amounts H and L corresponding to the ISO sensitivity may be previously retained in a look-up table and read from the look-up table. Then, a plurality of the look-up tables may be prepared, and the look-up table may be switched among the plurality of the look-up tables depending on the image pickup condition.

Here, while examples of factors which decide a coefficient by which the noise reduction amount of each of the RGB channels is multiplied include the WB correction process, the color matrix process and the ISO sensitivity, if another factor also exists, of course, the coefficient by which the noise reduction amount is multiplied may be decided also depending on the above described factor.

It should be noted that while the NR process based on a coring process as described above has been applied in the present embodiment, an applicable NR process is not limited thereto, and the NR process which can change the noise reduction amount is broadly applicable. For example, examples of a simplest process include a technique for applying the NR process of a type in which a frequency characteristic (that is, a filter coefficient) of a smoothing filter is changed depending on the noise reduction amount.

The RGB Bayer image of 8M, which has been applied with the NR process based on certain noise reduction amounts RH, GH and BH by using such an NR process of any type in which the noise reduction amount can be changed, is set as an $R_H G_H B_H$ Bayer image of 8M (the first noise-reduced RGB Bayer array image data). Moreover, an image obtained by applying the NR process to the G channel of the same RGB Bayer image of 8M by using a certain noise reduction amount GL (GL<GH) is set as a $G_L$ block of 4M (the second noise-reduced G-channel image data).

Next, in step SA2, a process as described below is performed.

A $G_H$ at a position of an $R_H$ in the $R_H G_H B_H$ Bayer image of 8M which has been calculated by the process in step SA1 as described above is calculated by a plurality of interpolation methods. Furthermore, a plurality of color difference candidates ($R_H$–$G_H$) at the position of the $R_H$ are calculated by using a plurality of the $G_H$s obtained by the interpolation. Here, in the present embodiment, it is assumed that three interpolation methods to be described next are used as the interpolation methods for the $G_H$.

First, a first interpolation method is a method of calculating the $G_H$ at the position of the $R_H$ by linear interpolation based on $G_H$s existing on both sides of the $R_H$ in a horizontal direction. Next, a second interpolation method is a method of calculating the $G_H$ at the position of the $R_H$ by the linear interpolation based on $G_H$s present above and below the $R_H$ in a vertical direction. Furthermore, a third interpolation method is a method of interpolating the $G_H$ at the position of the $R_H$ based on four $G_H$ pixels adjacent to the $R_H$ in the horizontal and vertical directions.

Three color difference candidates ($R_H$–$G_H$) are calculated based on three $G_H$s which have been calculated by the three interpolation methods, respectively.

Subsequently, for each of the three color difference candidates ($R_H$–$G_H$), a degree of similarity in 3×3 color differences (if an area of 5×5 pixels centering around the position of a targeted $R_H$ is set, 3×3 color difference candidates ($R_H$–$G_H$) exist within the area) is calculated (for example, by a method of obtaining a summation of difference absolute values or the like). Then, one with a maximum degree of similarity is selected from the three color difference candidates ($R_H$–$G_H$), and the selected color difference candidate with the maximum degree of similarity is decided as the color difference ($R_H$–$G_H$).

Furthermore, a process similar to the above process is also preformed for $B_H$, and the color difference ($B_H$–$G_H$) is decided.

The process as described above is performed for the entire image, and thereby, an ($R_H$–$G_H$)$G_H$($B_H$–$G_H$) Bayer image of 8M is calculated.

In addition, an occurrence of a false color of R and B due to aliasing distortion can be decreased by performing the process in step SA2.

It should be noted that, in the above description, when a missing G signal is interpolated, two pixels adjacent in the horizontal direction, two pixels adjacent in the vertical direction, and the four pixels adjacent in the horizontal and vertical directions have been used, which, however, is not limited thereto, and other interpolation methods are also applicable. For example, it is also possible to apply a method of obtaining the interpolation of the missing G signal by the linear interpolation of horizontally adjacent G pixels, the linear interpolation of vertically adjacent G pixels, and a weighted mean of two interpolated values thereof, based on a gradient of the G signal at a periphery of the missing G signal, or interpolation methods other than the above method may be applied. Whichever interpolation method has been used to calculate the G signal, if the color differences (R–G) and (B–G) have been calculated based on the G signal, only a level of the decrease in the false color differs.

Subsequently, in step SA3, a process as described below is performed.

The $G_H$ signal in the ($R_H$–$G_H$)$G_H$($B_H$–$G_H$) Bayer image of 8M calculated in step SA2 is replaced with the $G_L$ signal calculated in step SA1, and thereby, an ($R_H$–$G_H$)$G_L$($B_H$–$G_H$) Bayer image of 8M is calculated.

According to the process in step SA3, the signal $G_L$ in which the noise reduction amount is small and resolution impression is retained is used in the process, and therefore, an image in which the resolution impression is retained can be eventually generated.

Then, in step SA4, a process as described below is performed.

For the ($R_H$–$G_H$)$G_L$($B_H$–$G_H$) Bayer image of 8M calculated in step SA3, the band-limited interpolation process as shown below is performed.

$$(R_H - G_H) + G_L \to R$$

$$G_L \to G$$

$$(B_H - G_H) + G_L \to B$$

Thereby, a 2M RGB image is calculated. It should be noted that, in the present embodiment, reducing interpolation with a Lanczos filter is used as the band-limited interpolation process, which, however, is not limited thereto.

Since the signal $G_H$ has been replaced with the signal $G_L$ according to step SA3 as described above, the noise reduction amount has become small for the G signal. However, in the band-limited interpolation process performed in step SA4, the band is limited so that the aliasing distortion is not caused when the G signal is vertically and horizontally reduced to half, and therefore, noise in a high frequency band of the G signal can be cut. Consequently, after the band-limited interpolation has been performed, the noise reduction amount for the G signal becomes larger than $G_L$, and the amount of noise can be eventually small.

It should be noted that, in the present embodiment, a case where an image that is vertically and horizontally reduced to half, respectively (that is, to one quarter of the number of pixels) is created has been described by way of example, which, however, is not limited thereto, and a reduction ratio may be arbitrarily changed. Then, a final amount of noise in the G signal is decided depending on a low pass filter characteristic of the band-limited interpolation process which is decided corresponding to the reduction ratio, and the above described noise reduction amount GL.

In other words, the above description means that the noise reduction amount GL can be decided depending on the reduction ratio for the image and a target amount of noise (corresponding to the amount of luminance noise) of the G signal. For example, if the reduction ratio is lowered (that is, the reduction is performed to a larger degree), a filter characteristic of the band-limited interpolation process becomes the filter characteristic in which a high frequency is more likely to be cut, which means that much noise included in the high frequency can be cut. Therefore, then, the noise reduction amount GL for the G signal may be set to be smaller so that the final amount of noise in the G signal is set to be a target value. In addition, conversely, if an image with the reduction ratio larger than 1/2 (for example, the reduction ratio of 2/3 or the like) is created, the filter characteristic of the band-limited interpolation process becomes the filter characteristic in which the high frequency is more likely to pass through, which means that a degree with which the high frequency noise is cut becomes smaller. Therefore, then, the noise reduction amount GL for the G signal may be set to be larger (but also set in a range satisfying GL<GH) so that the final amount of noise in the G signal is set to be the target value. Here, a correspondence relationship between the image pickup parameter and the above described target value has been previously stored in a look-up table (not shown) included in the noise reduction amount deciding portion 8, and the target value depending on the image pickup parameter is decided by referring to the look-up table.

Figure 6:
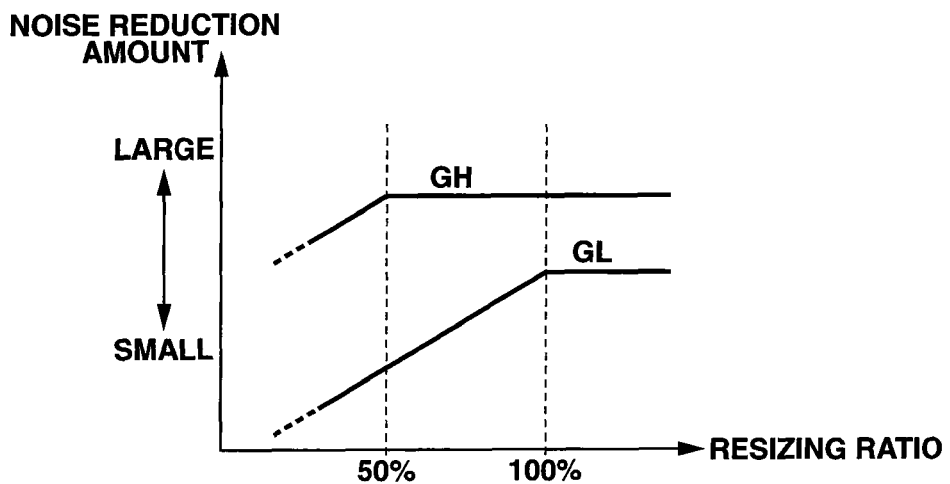
FIG. 6 is a graph showing relationships between an image resizing ratio and the noise reduction amounts GH and GL in a case where an amount of noise in a G signal at a predetermined ISO sensitivity is set to be a target value, in the above described Embodiment 1.

FIG. 6 is a graph showing relationships between the image resizing ratio and the noise reduction amounts GH and GL in a case where the amount of noise in the G signal at a predetermined ISO sensitivity is set to be the target value.

In an example shown in FIG. 6, when the resizing ratio becomes smaller than 100%, the noise reduction amount GL monotonically decreases. In contrast, the noise reduction amount GH maintains a certain value when the resizing ratio is equal to or larger than 50%, and starts to monotonically decrease when the resizing ratio becomes smaller than 50%.

According to the Embodiment 1 as described above, the noise reduction amount is set to be larger for R and B with the amount of noise which is generally larger than the amount of noise of G, so that more noise is reduced. Therefore, the color noise can be reduced. Moreover, when the Bayer interpolation is performed, $G_L$ in which the resolution impression is retained is used. Therefore, the resolution impression of the image after the interpolation can also be retained. Furthermore, when the color difference is calculated, R and G, or B and G, with the noise reduction amounts of the same degree (that is, R and G, or B and G, which have uniform waveforms and retain the same degree of the resolution impression and sharpness impression) are used. Therefore, the occurrence of the false color at an edge portion can be reduced.

In addition, unlike the above described related art, the noise reduction is also performed at the edge portion, and thus the noise at the edge portion can also be reduced.

Embodiment 2

Figure 7:
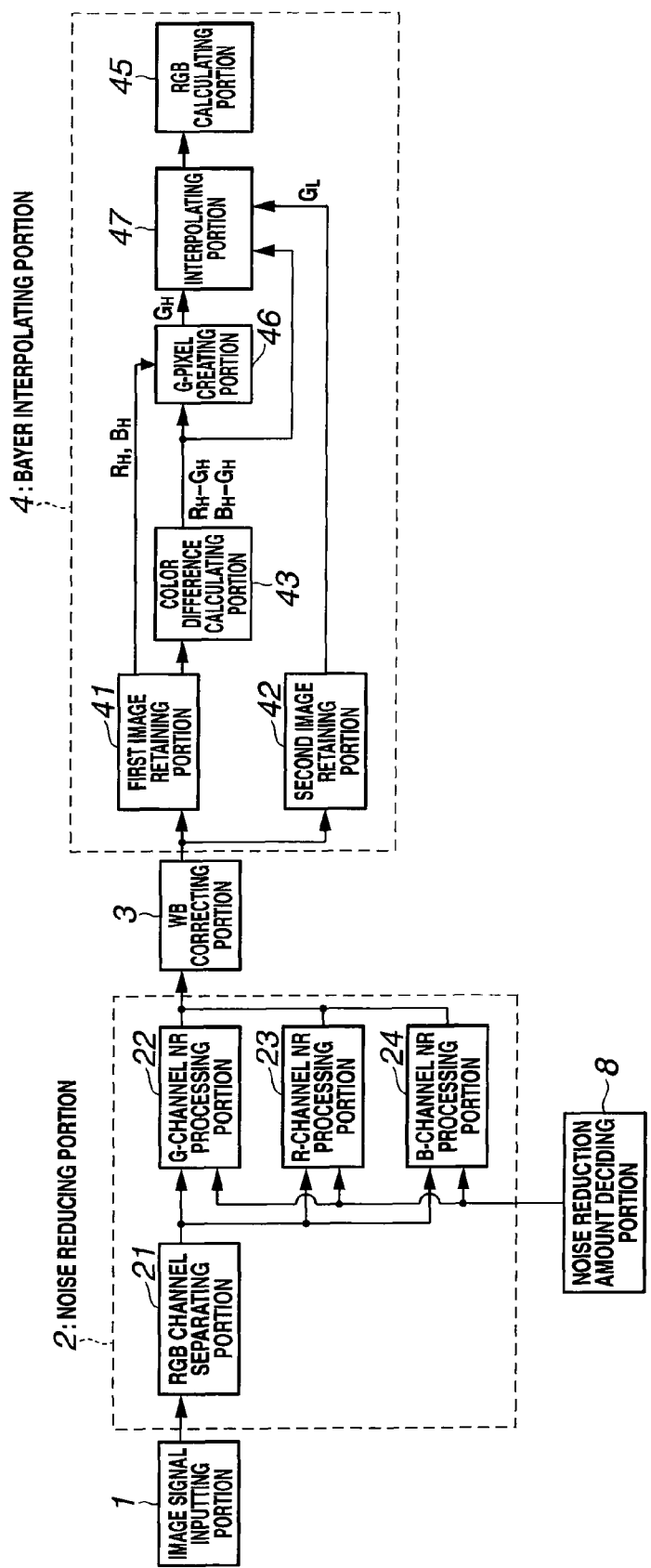
FIG. 7 is a block diagram showing the configurations of the noise reducing portion and the Bayer interpolating portion in an Embodiment 2 of the present invention in more detail.
Figure 8:
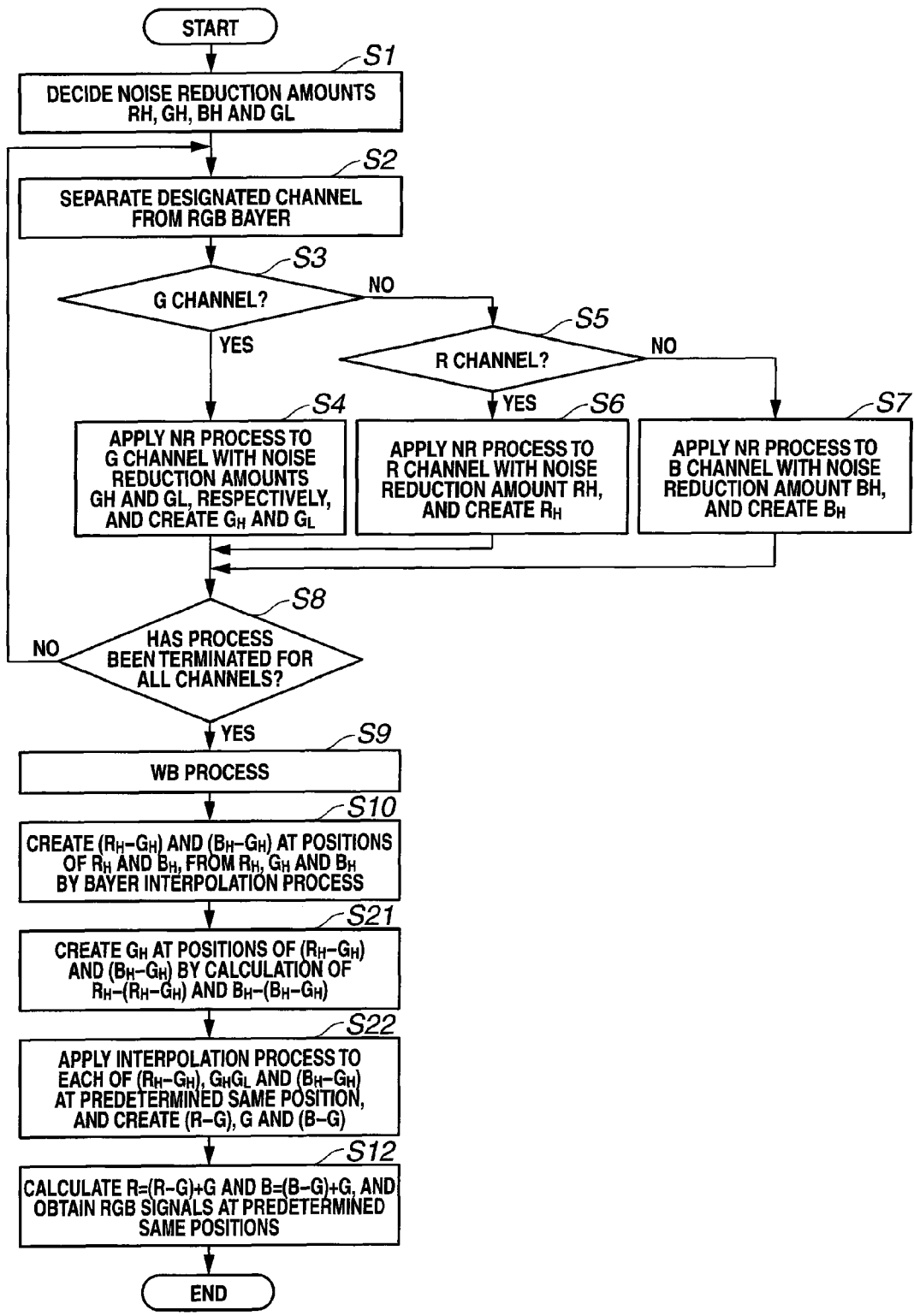
FIG. 8 is a flowchart showing a flow of processes in portions of the configurations as shown in FIG. 7 in the image processing apparatus of the above described Embodiment 2.
Figure 9:
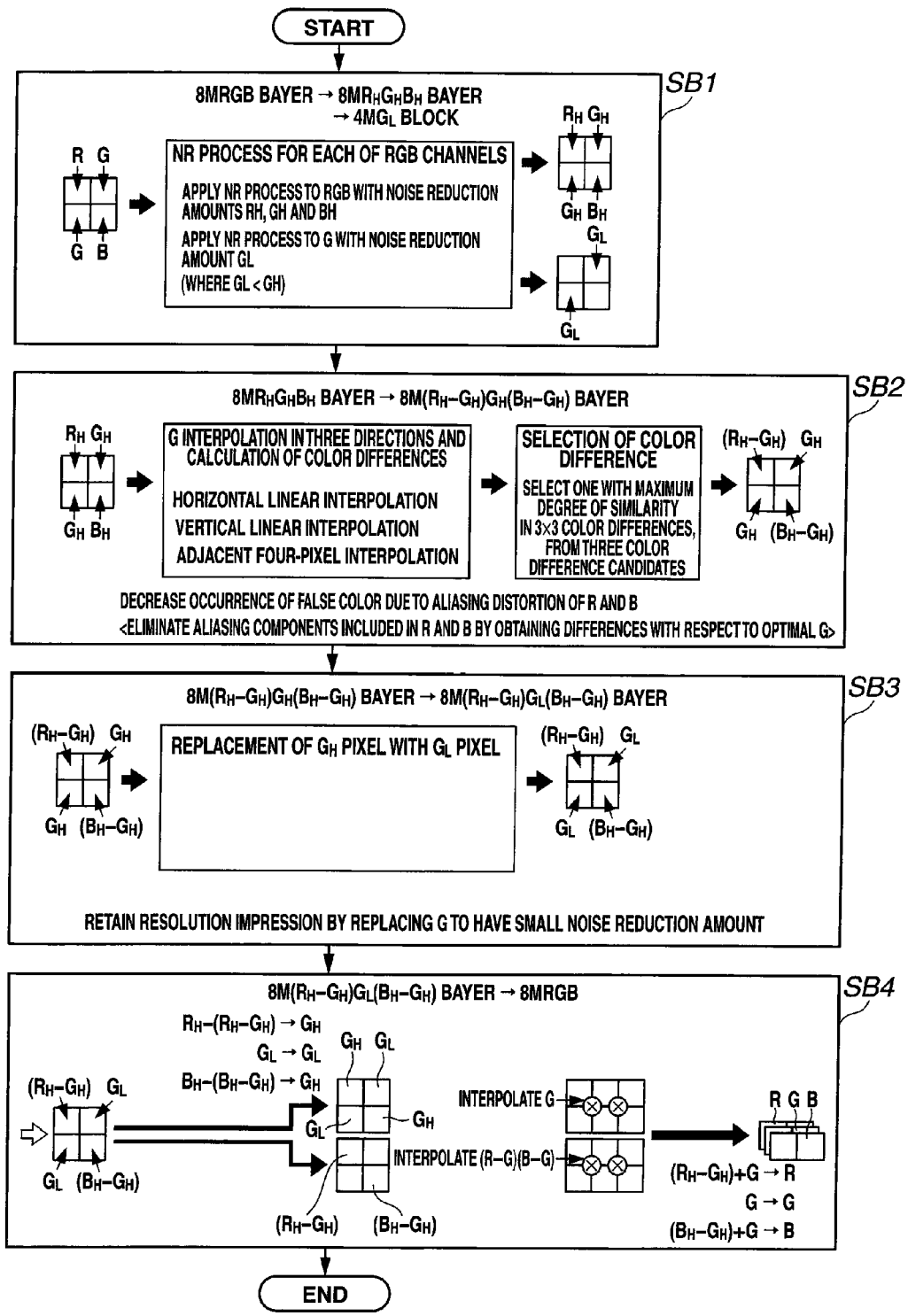
FIG. 9 is a flowchart schematically showing details of the processes in the portions of the configurations as shown in FIG. 7 in the image processing apparatus of the above described Embodiment 2.

FIGS. 7 to 9 show an Embodiment 2 of the present invention. FIG. 7 is a block diagram showing the configurations of the noise reducing portion and the Bayer interpolating portion in more detail. In the Embodiment 2, the same reference numerals are assigned to portions similar to the above described Embodiment 1, descriptions of such portions are omitted, and only different points will be mainly described.

First, the configuration of the entire image processing apparatus in the Embodiment 2 is similar to the configuration shown in FIG. 1 of the above described Embodiment 1.

In addition, in the Embodiment 2, it is premised that the Bayer interpolation process performed by the Bayer interpolating portion 4 is a process for converting, for example, the Bayer image of 8 million (8M) pixels into an RGB image of 8 million (8M) pixels. In addition, under such a process, the color noise can be reduced, which will be described with reference to FIG. 7.

The configurations shown in FIG. 7 are almost similar to the configurations shown in FIG. 2 of the above described Embodiment 1, while an internal configuration of the Bayer interpolating portion 4 is slightly different.

In other words, in the Bayer interpolating portion 4 of the Embodiment 2, a G-pixel creating portion 46 which is the RGB calculating section and a G-pixel creating section, and an interpolating portion 47 which is the RGB calculating section and an interpolating section are arranged instead of the band-limited interpolating portion 44 shown in FIG. 2. Here, the first image retaining portion 41 and the color difference calculating portion 43 are connected to the G-pixel creating portion 46. Moreover, the second image retaining portion 42, the color difference calculating portion 43 and the G-pixel creating portion 46 are connected to the interpolating portion 47. Furthermore, the interpolating portion 47 is connected to the RGB calculating portion 45.

Next, operations of the configurations as shown in FIG. 7 will be described.

Among the operations of the configurations shown in FIG. 7, the respective processes in the image signal inputting portion 1, the noise reducing portion 2, the noise reduction amount deciding portion 8 and the WB correcting portion 3 are similar to the processes described with reference to FIG. 2 in the above described Embodiment 1.

Moreover, in the Bayer interpolating portion 4, the signals inputted to the first image retaining portion 41, the signal inputted to the second image retaining portion 42, and a process for calculating the color difference Bayer signals which is performed by the color difference calculating portion 43, are also similar to the above described Embodiment 1.

The signals $R_H$ and $B_H$ from the first image retaining portion 41, and the signals $(R_H-G_H)$ and $(B_H-G_H)$ from the color difference calculating portion 43 are inputted to the G-pixel creating portion 46. The G-pixel creating portion 46 creates the signals $G_H$ at positions of the signals $(R_H-G_H)$ and $(B_H-G_H)$ based on the inputted signals.

The signals $G_H$ from the G-pixel creating portion 46, the signals $(R_H-G_H)$ and $(B_H-G_H)$ from the color difference calculating portion 43, and the signal $G_L$ from the second image retaining portion 42 are inputted to the interpolating portion 47. Then, the interpolating portion 47 performs the interpolation for the signals $G_H$ and the signal $G_L$, and thereby creates the interpolated G signal. Also, the interpolating portion 47 performs the interpolation for the signals $(R_H-G_H)$ and $(B_H-G_H)$, and thereby creates the interpolated signal $(R_H-G_H)$ and the interpolated signal $(B_H-G_H)$.

The signals interpolated by the interpolating portion 47 are inputted to the RGB calculating portion 45. The RGB calculating portion 45 sets the interpolated G signal which has been inputted, as the G signal. Also, the RGB calculating portion 45 calculates the R signal by adding the interpolated color difference signal $(R_H-G_H)$ and the interpolated G signal, and calculates the B signal by adding the interpolated color difference signal $(B_H-G_H)$ and the interpolated G signal. Thereby, the RGB signals are calculated.

Next, with reference to FIGS. 8 and 9, an example of the flow of the specific processes in the image processing apparatus will be described. FIG. 8 is a flowchart showing a flow of processes in portions of the configurations as shown in FIG. 7 in the image processing apparatus. FIG. 9 is a flowchart schematically showing details of the processes in the portions of the configurations as shown in FIG. 7 in the image processing apparatus.

When the processes of FIG. 8 are started, processes similar to the processes shown in steps S1 to S10 of FIG. 3 are performed.

Next, based on the $R_H$ and $B_H$ signals applied with the NR process by using the noise reduction amounts RH and BH, respectively, and the optimal color difference signals $(R_H-G_H)$ and $(B_H-G_H)$, following calculations are performed.

$$R_H-(R_H-G_H)$$

$$B_H-(B_H-G_H)$$

Thereby, the $G_H$ signals at the positions of the signals $(R_H-G_H)$ and $(B_H-G_H)$ are created (step S21).

Subsequently, an interpolation process is performed for the $G_H$ signals and the $G_L$ signal applied with the NR process by using the noise reduction amount GL, as well as the optimal color difference signals $(R_H-G_H)$ and $(B_H-G_H)$, respectively (step S22).

Afterward, in step S12, the interpolated G signal and interpolated (R−G) and (B−G) signals are added, and thereby, interpolated R and B signals are calculated.

Next, with reference to FIG. 9, main portions of the respective processes shown in FIG. 8 will be more specifically described.

Processes in steps SB1 to SB3 are similar to the processes shown in steps SA1 to SA3 of the above described Embodiment 1.

Subsequently, in step SB4, a process as described below is performed.

$(R_H-G_H)$ in the $(R_H-G_H)G_L(B_H-G_H)$ Bayer image of 8M calculated in step SB3, and $R_H$ calculated in step SB 1 are used to perform the calculation of $R_H-(R_H-G_H)$. Thereby, the $G_H$ signal at the position of the color difference signal $(R_H-G_H)$ is calculated.

Similarly, $(B_H-G_H)$ in the $(R_H-G_H)G_L(B_H-G_H)$ Bayer image of 8M calculated in step SB3, and $B_H$ calculated in step SB1 are used to perform the calculation of $B_H-(B_H-G_H)$. Thereby, the $G_H$ signal at the position of the color difference signal $(B_H-G_H)$ is calculated.

As described above, a G block and an $(R_H-G_H)(B_H-G_H)$ block are calculated from the $(R_H-G_H)G_L(B_H-G_H)$ Bayer image of 8M.

Subsequently, a G signal of 8M is created by performing the interpolation process for the G block, and also, a color difference signal $(R_H-G_H)$ of 8M and a color difference signal $(B_H-G_H)$ of 8M are created by performing the interpolation process for the $(R_H-G_H)(B_H-G_H)$ block. Then, results of the interpolation processes are used to perform additions as follows at respective pixel positions.

$$(R_H-G_H)+G \rightarrow R$$

$$G \rightarrow G$$

$$(B_H-G_H)+G \rightarrow B$$

Thereby, the RGB image of 8M is calculated.

It should be noted that, in the above description, while an example has been shown in which the RGB image of the same number of pixels as the number of pixels of the RGB Bayer image is created, the RGB image of the number of pixels which is larger than the number of pixels of the RGB Bayer image can also be created by slightly changing the interpolation process, or similarly to the above described Embodiment 1, the reduced RGB image of the number of pixels which is smaller than the number of pixels of the RGB Bayer image can also be created. For example, in the latter case, the creation is enabled by replacing the above described interpolation process with the band-limited interpolation process of the Embodiment 1.

According to the Embodiment 2 as described above, the noise reduction amount is set to be larger for R and B with the amount of noise which is generally larger than the amount of noise of G, so that more noise is reduced. Therefore, the color noise can be reduced. Moreover, when the Bayer interpolation is performed, $G_L$ in which the resolution impression is retained is used. Therefore, the resolution impression of the image after the interpolation can also be retained. Furthermore, when the color difference is calculated, R and G, or B and G, with the noise reduction amounts of the same degree (that is, R and G, or B and G, which have the uniform waveforms and retain the same degree of the resolution impression and the sharpness impression) are used. Therefore, the occurrence of the false color at the edge portion can be reduced.

In addition, unlike the above described related art, the noise reduction is also performed at the edge portion, and thus the noise at the edge portion can also be reduced.

Embodiment 3

Figure 10:
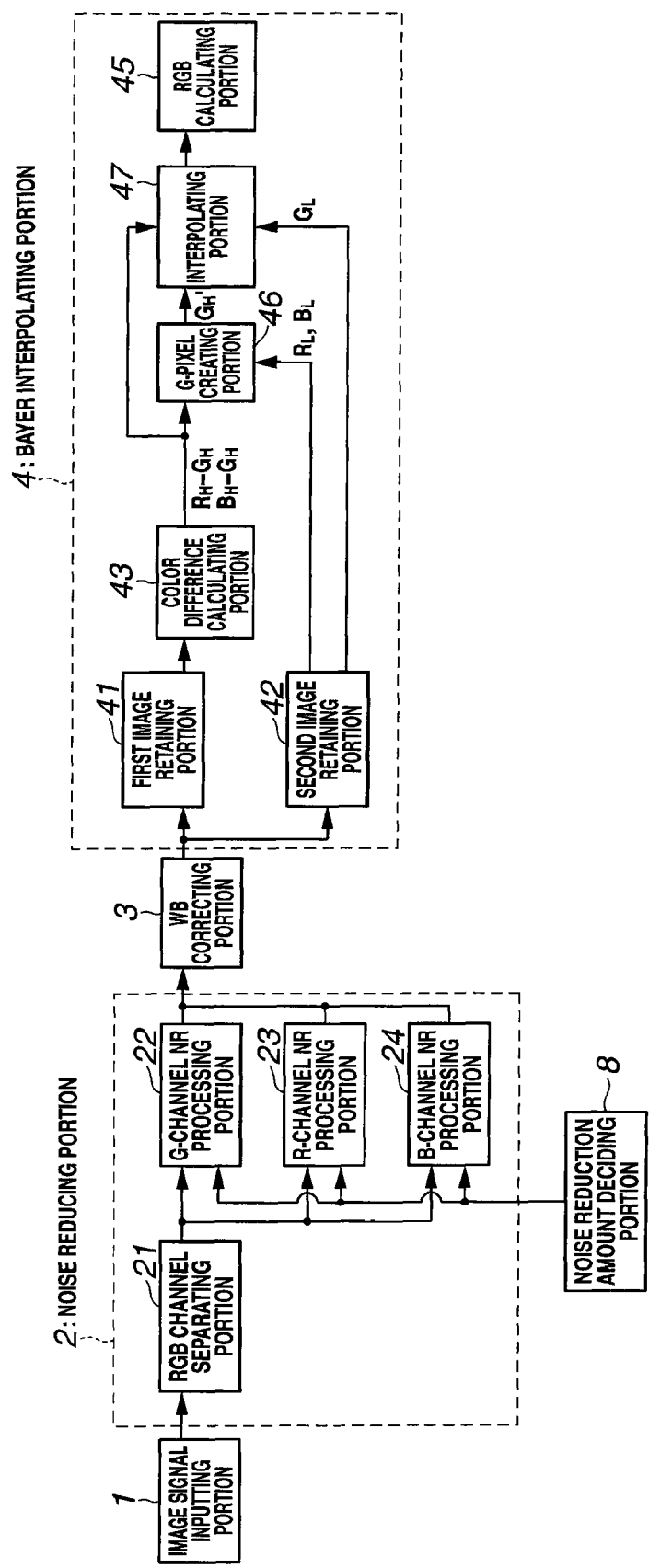
FIG. 10 is a block diagram showing the configurations of the noise reducing portion and the Bayer interpolating portion in an Embodiment 3 of the present invention in more detail.
Figure 11:
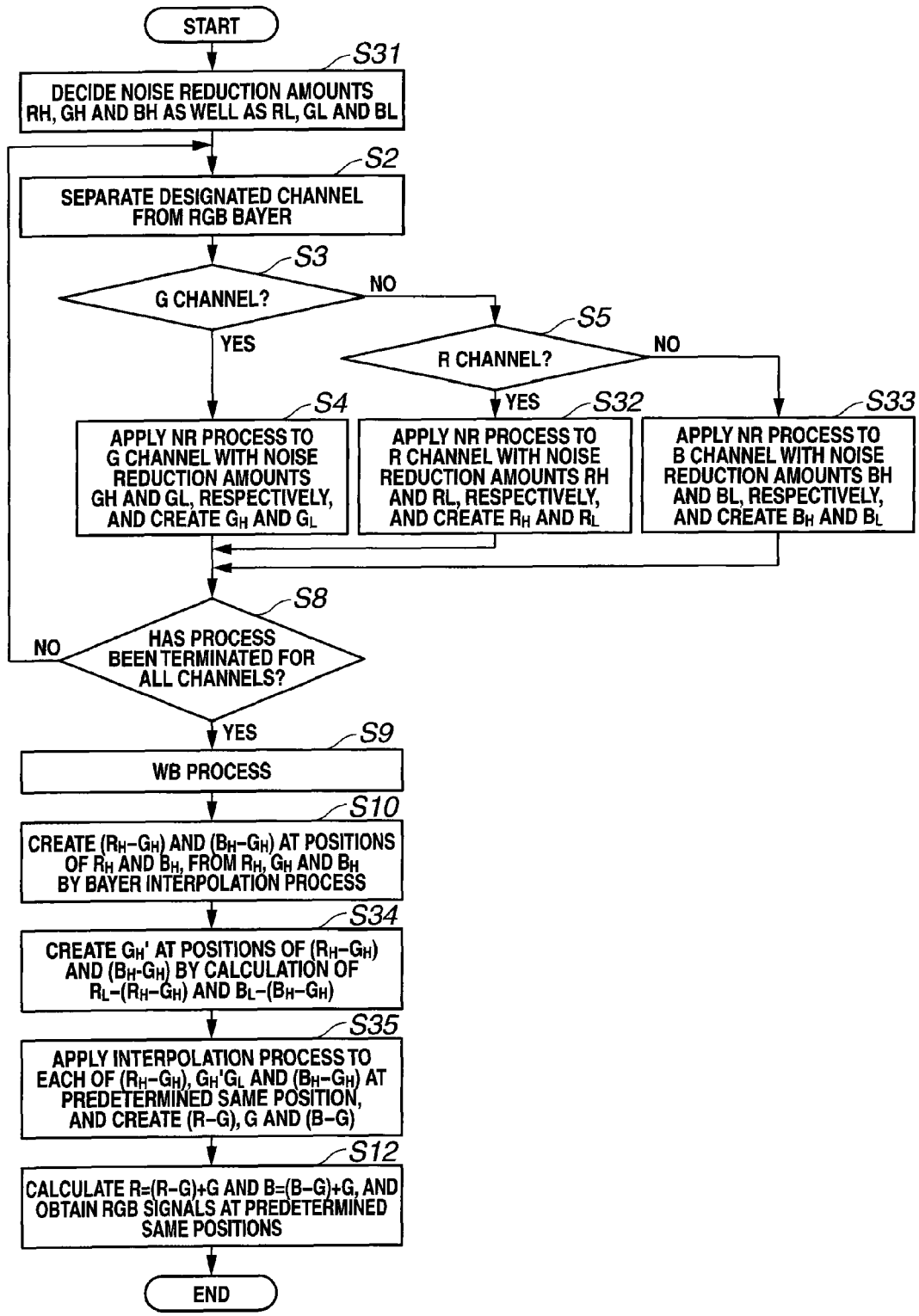
FIG. 11 is a flowchart showing a flow of processes in portions of the configurations as shown in FIG. 10 in the image processing apparatus of the above described Embodiment 3.
Figure 12:
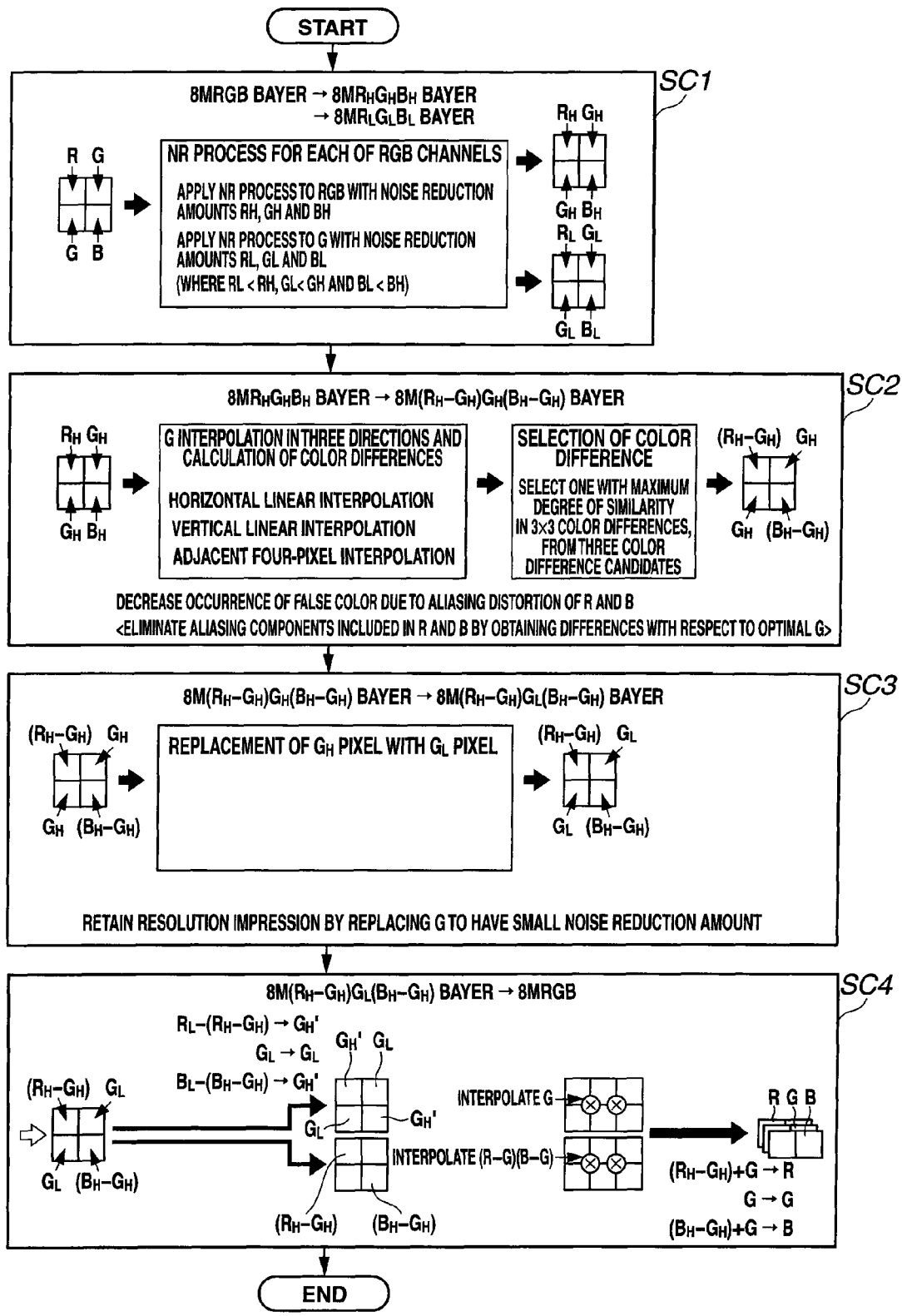
FIG. 12 is a flowchart schematically showing details of the processes in the portions of the configurations as shown in FIG. 10 in the image processing apparatus of the above described Embodiment 3.

FIGS. 10 to 12 show an Embodiment 3 of the present invention. FIG. 10 is a block diagram showing the configurations of the noise reducing portion and the Bayer interpolating portion in more detail. In the Embodiment 3, the same reference numerals are assigned to portions similar to the above described Embodiments 1 and 2, descriptions of such portions are omitted, and only different points will be mainly described.

First, the configuration of the entire image processing apparatus in the Embodiment 3 is similar to the configuration shown in FIG. 1 of the above described Embodiment 1.

In addition, in the Embodiment 3, similarly to the above described Embodiment 2, it is premised that the Bayer interpolation process performed by the Bayer interpolating portion 4 is the process for converting, for example, the Bayer image of 8 million (8M) pixels into the RGB image of 8 million (8M) pixels. In addition, under such a process, the color noise can be reduced, which will be described with reference to FIG. 10.

The configurations shown in FIG. 10 are almost similar to the configurations shown in FIG. 7 of the above described Embodiment 2, while a signal flow within the Bayer interpolating portion 4 is different from that of the Embodiment 2. In other words, in the Bayer interpolating portion 4 of the Embodiment 3, while the second image retaining portion 42 is also connected to the G-pixel creating portion 46, the first image retaining portion 41 is not directly connected to the G-pixel creating portion 46.

Furthermore, in the Embodiment 3, contents of the process performed by the noise reducing portion 2, and contents of the process performed by the G-pixel creating portion 46 are also different from those of the above described Embodiment 2.

Next, operations of the configurations as shown in FIG. 10 will be described.

Among the operations of the configurations shown in FIG. 10, the process in the image signal inputting portion 1, and the process in the RGB channel separating portion 21 in the noise reducing portion 2 are similar to the processes described with reference to FIG. 2 in the above described Embodiment 1.

However, in the present embodiment, the noise reduction amount deciding portion 8 decides the first noise reduction amounts RH, GH and BH, and the second noise reduction amount GL, and also further decides second noise reduction amounts RL and BL (here, the decision is made so that RL<RH and BL<BH are satisfied, respectively, and it should be noted that the decision is also made so that GL<GH is satisfied, similarly to the above description).

Then, the R, G and B-channel NR processing portions 23, 22 and 24 use the noise reduction amounts RH, GH and BH to perform the NR process, and calculate the $R_HG_HB_H$ Bayer signals. Also, the R, G and B-channel NR processing portions 23, 22 and 24 use the noise reduction amounts RL, GL and BL to perform the NR process, and calculate $R_LG_LB_L$ Bayer signals (second noise-reduced R-channel image data, the second noise-reduced G-channel image data, and second noise-reduced B-channel image data). Afterward, the R, G and B-channel NR processing portions 23, 22 and 24 output the $R_HG_HB_H$ Bayer signals and the $R_LG_LB_L$ Bayer signals which have been calculated, to the WB correcting portion 3.

Next, the WB correcting portion 3 performs the WB process for the $R_HG_HB_H$ Bayer signals and the $R_LG_LB_L$ Bayer signals from the noise reducing portion 2, as described above.

Subsequently, the above described $R_HG_HB_H$ Bayer signals, which have been outputted from the R, G and B-channel NR processing portions 23, 22 and 24 and applied with the WB process by the WB correcting portion 3, are inputted to and retained in the first image retaining portion 41 in the Bayer interpolating portion 4.

Moreover, the above described $R_L G_L B_L$ Bayer signals, which have been outputted from the R, G and B-channel NR processing portions 23, 22 and 24 and applied with the WB process by the WB correcting portion 3, are inputted to and retained in the second image retaining portion 42 in the Bayer interpolating portion 4.

A subsequent process for calculating the $(R_H-G_H)G_H(B_H-G_H)$ color difference Bayer signals, which is performed by the color difference calculating portion 43 in the Bayer interpolating portion 4, is similar to that of the above described Embodiment 1.

The signals $R_L$ and $B_L$ from the second image retaining portion 42, and the signals $(R_H-G_H)$ and $(B_H-G_H)$ from the color difference calculating portion 43 are inputted to the G-pixel creating portion 46. The G-pixel creating portion 46 creates signals $G_H'$ at the positions of the signals $(R_H-G_H)$ and $(B_H-G_H)$ based on the inputted signals as will be described later.

The signals $G_H'$ from the G-pixel creating portion 46, the signals $(R_H-G_H)$ and $(B_H-G_H)$ from the color difference calculating portion 43, and the signal $G_L$ from the second image retaining portion 42 are inputted to the interpolating portion 47. The interpolating portion 47 performs the interpolation based on the inputted signals as described above.

A subsequent process in the RGB calculating portion 45 is similar to the above description.

Next, with reference to FIGS. 11 and 12, an example of the flow of the specific processes in the image processing apparatus will be described. FIG. 11 is a flowchart showing a flow of processes in portions of the configurations as shown in FIG. 10 in the image processing apparatus. FIG. 12 is a flowchart schematically showing details of the processes in the portions of the configurations as shown in FIG. 10 in the image processing apparatus.

When the processes are started, the noise reduction amounts RH, GH and BH and the noise reduction amounts RL, GL and BL are decided by the noise reduction amount deciding portion 8 (step S31). Then, the noise reduction amounts GH and GL are outputted to the G-channel NR processing portion 22, the noise reduction amounts RH and RL are outputted to the R-channel NR processing portion 23, and the noise reduction amounts BH and BL are outputted to the B-channel NR processing portion 24, respectively.

The subsequent processes in steps S2 to S5 are similar to those of the above described Embodiment 1.

Moreover, in step S5, if it is determined that the separated channel is the R channel, the R-channel NR processing portion 23 applies the NR process to the R-channel signal by using the noise reduction amount RH, and creates the signal $R_H$. Also, the R-channel NR processing portion 23 applies the NR process to the R-channel signal by using the noise reduction amount RL, and creates the signal $R_L$ (step S32). Then, the R-channel NR processing portion 23 outputs the created signals $R_H$ and $R_L$ to the WB correcting portion 3.

In step S5, if it is determined that the separated channel is not the R channel, the determination means that the separated channel is the B channel. Thus, the B-channel NR processing portion 24 applies the NR process to the B-channel signal by using the noise reduction amount BH, and creates the signal $B_H$. Also, the B-channel NR processing portion 24 applies the NR process to the B-channel signal by using the noise reduction amount BL, and creates the signal $B_L$ (step S33). Then, the B-channel NR processing portion 24 outputs the created signals $B_H$ and $B_L$ to the WB correcting portion 3.

It should be noted that specific NR processes in steps S4, S32 and S33 will be described later with reference to step SC1 of FIG. 12.

Afterward, the processes in steps S8 to S10 are performed.

Next, based on the $R_L$ and $B_L$ signals applied with the NR process by using the noise reduction amounts RL and BL, respectively, and the optimal color difference signals $(R_H-G_H)$ and $(B_H-G_H)$, following calculations are performed.

$$R_L-(R_H-G_H)$$

$$B_L-(B_H-G_H)$$

Thereby, the $G_H'$ signals are created (step S34).

Subsequently, the interpolation process is performed for the $G_H'$ signals and the $G_L$ signal applied with the NR process by using the noise reduction amount GL, as well as the optimal color difference signals $(R_H-G_H)$ and $(B_H-G_H)$, respectively (step S35).

Afterward, in step S12, the interpolated G signal and the interpolated (R–G) and (B–G) signals are added, and thereby, the interpolated R and B signals are calculated.

It should be noted that specific interpolation processes in steps S34 and S35 will be described later with reference to step SC4 of FIG. 12.

Next, with reference to FIG. 12, main portions of the respective processes shown in FIG. 11 will be more specifically described.

First, in step SC1, a process as described below is performed.

The noise reduction process (NR process) is applied to the RGB Bayer image of 8M, for each of the RGB channels. The NR process is the NR process in which the noise reduction amount can be changed. It should be noted that the NR process applicable to the present embodiment is not limited to the NR process based on the coring process, and the process which can change the noise reduction amount is broadly applicable, similarly to the above description.

The RGB Bayer image of 8M, which has been applied with the NR process based on the certain noise reduction amounts RH, GH and BH by using such an NR process of any type in which the noise reduction amount can be changed, is set as the $R_H G_H B_H$ Bayer image of 8M. Moreover, the same RGB Bayer image of 8M applied with the NR process based on certain noise reduction amounts RL, GL and BL, which are different from the noise reduction amounts RH, GH and BH (RL<RH, GL<GH and BL<BH), is set as an $R_L G_L B_L$ Bayer image of 8M.

Subsequent processes in steps SC2 and SC3 are similar to the processes shown in steps SA2 and SA3 of the above described Embodiment 1.

Afterward, in step SC4, a process as described below is performed.

$(R_H-G_H)$ in the $(R_H-G_H)G_L(B_H-G_H)$ Bayer image of 8M calculated in step SC3, and $R_L$ calculated in step SC1 are used to perform the calculation of $R_L-(R_H-G_H)$. Thereby, the $G_H'$ signal at the position of the color difference signal $(R_H-G_H)$ is calculated.

Similarly, $(B_H-G_H)$ in the $(R_H-G_H)G_L(B_H-G_H)$ Bayer image of 8M calculated in step SC3, and $B_L$ calculated in step SC1 are used to perform the calculation of $B_L-(B_H-G_H)$. Thereby, the $G_H'$ signal at the position of the color difference signal $(B_H-G_H)$ is calculated.

As described above, the G block and the $(R_H-G_H)(B_H-G_H)$ block are calculated from the $(R_H-G_H)G_L(B_H-G_H)$ Bayer image of 8M.

Subsequently, the G signal of 8M is created by performing the interpolation process for the G block, and also, the color difference signal $(R_H-G_H)$ of 8M and the color difference signal $(B_H-G_H)$ of 8M are created by performing the interpolation process for the $(R_H-G_H)(B_H-G_H)$ block. Then, the results of the interpolation processes are used to perform the additions as follows at the respective pixel positions.

$$(R_H-G_H)+G \to R$$

$$G \to G$$

$$(B_H-G_H)+G \to B$$

Thereby, the RGB image of 8M is calculated.

It should be noted that, in the above description, while the example has been shown in which the RGB image of the same number of pixels as the number of pixels of the RGB Bayer image is created, the RGB image of the number of pixels which is larger than the number of pixels of the RGB Bayer image can also be created by slightly changing the interpolation process, or similarly to the above described Embodiment 1, the reduced RGB image of the number of pixels which is smaller than the number of pixels of the RGB Bayer image can also be created. For example, in the latter case, the creation is enabled by replacing the above described interpolation process with the band-limited interpolation process of the Embodiment 1.

According to the Embodiment 3 as described above, the noise reduction amount is set to be larger for R and B with the amount of noise which is generally larger than the amount of noise of G, so that more noise is reduced. Therefore, the color noise can be reduced. Moreover, when the Bayer interpolation is performed, $G_L$ in which the resolution impression is retained is used. Therefore, the resolution impression of the image after the interpolation can also be retained. Furthermore, when $G_H'$ is calculated, $R_L-(R_H-G_H)=G_H+(R_L-R_H)$ is calculated, that is, a high frequency component $(R_L-R_H)$ of R is added to $G_H$. Therefore, $G_H$ with high resolution impression can be created. In addition, since $G_H$ with the high resolution impression is used to perform the interpolation, eventually, an image in which resolution impression is more retained can be created. In addition, when the color difference is calculated, R and G, or B and G, with the noise reduction amounts of the same degree (that is, R and G, or B and G, which have the uniform waveforms and retain the same degree of the resolution impression and the sharpness impression) are used. Therefore, the occurrence of the false color at an edge portion can be reduced.

In addition, unlike the above described related art, the noise reduction is also performed at the edge portion, and thus the noise at the edge portion can also be reduced.

It should be noted that the image processing apparatus of the above described respective embodiments is broadly applicable to products such as a fixed camera for broadcasting, an ENG (Electric News Gathering) camera, a consumer handy camera and a digital camera. Furthermore, the image processing apparatus of the above described respective embodiments is applicable not only to the image pickup apparatuses as described above, but also to an apparatus for displaying digitally converted images and an apparatus for inputting and outputting the digitally converted images (for example, an image editing apparatus, a noise decreasing apparatus, and a demosaicing processing apparatus).

In addition, while the image processing apparatus has been mainly described above, the present invention is also similarly applicable to an image processing program for performing similar processes, a storage medium for storing the image processing program, or an image processing method for performing the processes as described above. Therefore, for example, the present invention is also applicable to an image signal correction program (a CG program), an image editing program, a noise decreasing processing program, a demosaicing processing program and the like, which handle moving images and still images.

It should be noted that the present invention is not directly limited to the above described embodiments, and in a practical phase, a constituent element can be varied and embodied within a range not deviating from the gist thereof. Moreover, an appropriate combination of a plurality of constituent elements disclosed in the above described embodiments can form various inventions. For example, several constituent elements may be deleted from all constituent elements shown in the embodiments. Furthermore, constituent elements across different embodiments may be combined as appropriate. As described above, of course, various variations or applications are possible within the range not deviating from the gist of the invention.

What is claimed is:

1. An image processing apparatus for processing RGB Bayer array image data obtained from an image pickup device comprising an RGB Bayer array, the apparatus comprising:
    a noise reducing section for applying noise reduction to each of R-channel, G-channel, and B-channel of the RGB Bayer array image data with a first noise reduction amount, thereby calculating first noise-reduced RGB Bayer array image data, and also applying the noise reduction to at least the G-channel with a second noise reduction amount smaller than the first noise reduction amount, thereby calculating second noise-reduced G-channel image data;
    a color difference calculating section for performing interpolation of a G pixel at each position of an R pixel and at each position of a B pixel based on the first noise-reduced RGB Bayer array image data, and calculating first noise-reduced color difference data (R−G) at each position of the R pixel and first noise-reduced color difference data (B−G) at each position of the B pixel, using the interpolated G pixels; and
    an RGB calculating section for calculating R image data, G image data and B image data at respective pixel positions, based on the first noise-reduced color difference data (R−G), the first noise-reduced color difference data (B−G), and the second noise-reduced G-channel image data.

2. The image processing apparatus according to claim 1, wherein the RGB calculating section comprises a band-limited interpolating section for generating interpolated pixels in which each of one (R−G) signal, one G signal, and one (B−G) signal exists at a same interpolated pixel position, and in which a number of pixels corresponding to an (R−G) signal, a number of pixels corresponding to a G signal, and a number of pixels corresponding to a (B−G) signal are the same, wherein the interpolated pixels are generated based on the first noise-reduced color difference data (R−G), the first noise-reduced color difference data (B−G), and the second noise-reduced G-channel image data, and wherein a number of pixels corresponding to the interpolated pixels is smaller than a number of pixels corresponding to the second noise-reduced G-channel image data, and
    wherein the RGB calculating section calculates the R image data, the G image data and the B image data based on the interpolated pixels.

3. The image processing apparatus according to claim 1, wherein the RGB calculating section comprises:
    a G-pixel creating section for calculating a G signal at positions corresponding to an (R−G) signal and a (B−G) signal, based on the first noise-reduced color difference data (R−G), the first noise-reduced color difference data (B−G), and R-channel data and B-channel data in the first noise-reduced RGB Bayer array image data; and an interpolating section for generating interpolated pixels in which each of one (R−G) signal, one G signal, and one (B−G) signal exists at a same interpolated pixel position, and in which a number of pixels corresponding to an (R−G) signal, a number of pixels corresponding to a G signal, and a number of pixels corresponding to a (B−G) signal are the same, wherein the interpolated pixels are generated based on the first noise-reduced color difference data (R−G), the first noise-reduced color difference data (B−G), the second noise-reduced G-channel image data, and the G signal calculated by the G-pixel creating section, and wherein the RGB calculating section calculates the R image data, the G image data and the B image data based on the interpolated pixels.

4. The image processing apparatus according to claim 1, wherein the noise reducing section further calculates second noise-reduced R-channel image data and second noise-reduced B-channel image data by applying the noise reduction to the R-channel and the B-channel with the second noise reduction amount, wherein the RGB calculating section comprises:
a G-pixel creating section for calculating a G signal at positions corresponding to an (R−G) signal and a (B−G) signal, based on the first noise-reduced color difference data (R−G), the first noise-reduced color difference data (B−G), the second noise-reduced R-channel image data, and the second noise-reduced B-channel image data; and an interpolating section for generating interpolated pixels in which each of one (R−G) signal, one G signal, and one (B−G) signal exists at a same pixel position, and in which a number of pixels corresponding to an (R−G) signal, a number of pixels corresponding to a G signal, and a number of pixels corresponding to a (B−G) signal are the same, wherein the interpolated pixels are generated based on the first noise-reduced color difference data (R−G), the first noise-reduced color difference data (B−G), the second noise-reduced G-channel image data, and the G signal calculated by the G-pixel creating section, and wherein the RGB calculating section calculates the R image data, the G image data and the B image data based on the interpolated pixels.

5. The image processing apparatus according to claim 1, further comprising a reduction amount setting section for setting the first noise reduction amount and the second noise reduction amount.

6. The image processing apparatus according to claim 5, wherein the reduction amount setting section sets the first noise reduction amount and the second noise reduction amount depending on a shooting condition when the RGB Bayer array image data has been shot.

7. The image processing apparatus according to claim 5, wherein the reduction amount setting section sets the first noise reduction amount and the second noise reduction amount depending on a number of pixels of the RGB Bayer array image data, and a number of pixels of the G image data to be calculated by the RGB calculating section.

8. An image pickup apparatus, comprising:
a lens;
the image pickup device comprising the RGB Bayer array which is arranged at an image-forming position of the lens; and
the image processing apparatus according to claim 1,
wherein the image processing apparatus processes the RGB Bayer array image data which is obtained from the image pickup device.

9. A non-transitory computer-readable storage medium having stored thereon an image processing program for causing a computer to process RGB Bayer array image data obtained from an image pickup device comprising an RGB Bayer array, the image processing program causing the computer to perform functions comprising:
applying noise reduction to each of R-channel, G-channel, and B-channel of the RGB Bayer array image data with a first noise reduction amount, thereby calculating first noise-reduced RGB Bayer array image data, and also applying the noise reduction to at least the G-channel with a second noise reduction amount smaller than the first noise reduction amount, thereby calculating second noise-reduced G-channel image data;
performing interpolation of a G pixel at each position of an R pixel and at each position of a B pixel based on the first noise-reduced RGB Bayer array image data, and calculating first noise-reduced color difference data (R−G) at each position of the R pixel and first noise-reduced color difference data (B−G) at each position of the B pixel, using the interpolated G pixels; and
calculating R image data, G image data and B image data at respective pixel positions, based on the first noise-reduced color difference data (R−G), the first noise-reduced color difference data (B−G), and the second noise-reduced G-channel image data.

10. An image processing method of processing RGB Bayer array image data obtained from an image pickup device comprising an RGB Bayer array, the method comprising:
applying, by a noise reduction section, noise reduction to each of R-channel, G-channel, and B-channel of the RGB Bayer array image data with a first noise reduction amount, thereby calculating first noise-reduced RGB Bayer array image data, and also applying, by the noise reduction section, the noise reduction to at least the G-channel with a second noise reduction amount smaller than the first noise reduction amount, thereby calculating second noise-reduced G-channel image data;
performing, by a color difference calculating section, interpolation of a G pixel at each position of an R pixel and at each position of a B pixel based on the first noise-reduced RGB Bayer array image data, and calculating, by the color difference calculating section, first noise-reduced color difference data (R−G) at each position of the R pixel and first noise-reduced color difference data (B−G) at each position of the B pixel, using the interpolated G pixels; and
calculating, by an RGB calculating section, R image data, G image data and B image data at respective pixel positions, based on the first noise-reduced color difference data (R−G), the first noise-reduced color difference data (B−G), and the second noise-reduced G-channel image data.

* * * * *